United States Patent
Moeller et al.

(10) Patent No.: US 11,965,807 B2
(45) Date of Patent: Apr. 23, 2024

(54) DUCT SENSOR WITH DUCT PROBE FOR SAMPLING A FLUID FROM A DUCT AND METHOD OF OPERATION

(71) Applicant: Sensirion AG, Stäfa (CH)

(72) Inventors: Nicolas Moeller, Stäfa (CH); Mark Hornung, Stäfa (CH); Stefan Thiele, Stäfa (CH); Patrick Leidenberger, Stäfa (CH); Stefan Kostner, Stäfa (CH)

(73) Assignee: Sensirion AG, Stäfa (CH)

( * ) Notice: Subject to any disclaimer, the term of this patent is extended or adjusted under 35 U.S.C. 154(b) by 334 days.

(21) Appl. No.: 17/613,461

(22) PCT Filed: May 19, 2020

(86) PCT No.: PCT/EP2020/063879
§ 371 (c)(1),
(2) Date: Nov. 22, 2021

(87) PCT Pub. No.: WO2020/239515
PCT Pub. Date: Dec. 3, 2020

(65) Prior Publication Data
US 2022/0221380 A1    Jul. 14, 2022

(30) Foreign Application Priority Data
May 24, 2019  (EP) ..................... 19176549

(51) Int. Cl.
*G01N 1/22*    (2006.01)
*G01N 15/02*   (2006.01)
*G01N 15/06*   (2006.01)

(52) U.S. Cl.
CPC ........... *G01N 1/2247* (2013.01); *G01N 15/02* (2013.01); *G01N 15/06* (2013.01)

(58) Field of Classification Search
CPC ...... G01N 1/2247; G01N 15/02; G01N 15/06; G01N 1/2273
See application file for complete search history.

(56) References Cited

U.S. PATENT DOCUMENTS

2005/0097947 A1*  5/2005  Yonezawa ............... G01F 15/12
                                              73/114.35
2006/0027353 A1   2/2006  Luthi et al.
(Continued)

FOREIGN PATENT DOCUMENTS

DE    10 2014 010 719    1/2016
EP         2 835 592     2/2015
EP       3 258 241 A2   12/2017

OTHER PUBLICATIONS

International Search Report and Written Opinion dated Aug. 14, 2020, in related PCT Application No. PCT/EP2020/063879, 15 pages.

*Primary Examiner* — David Z Huang
(74) *Attorney, Agent, or Firm* — Foley & Lardner LLP

(57) ABSTRACT

A duct probe (20) for sampling a fluid from a main fluid flow (Fm) in a duct (10) defines an elongated supply channel (21) n elongated discharge channel (22). The supply channel has at least one inflow opening (23) for diverting a partial flow (Fp) from the main fluid flow into the supply channel, and the discharge channel has at least one outflow opening for returning the partial flow from the discharge channel into the main fluid flow after it has passed an environmental sensor (30). The duct probe further comprises at least one compensation opening (26) that connects the supply channel and the discharge channel in a region that is located between their closed and open ends. By the presence of the compensation opening (26), a jet flow (Fj) is created, which acts to reduce (Continued)

a pressure difference between the supply channel and the discharge channel when the duct probe is exposed to the main fluid flow (Fm).

14 Claims, 6 Drawing Sheets

(56) References Cited

U.S. PATENT DOCUMENTS

2008/0257011 A1   10/2008   Sahibzada et al.
2013/0160571 A1   6/2013    Williamson
2013/0255357 A1   10/2013   Anderson et al.

* cited by examiner

US 11,965,807 B2

DUCT SENSOR WITH DUCT PROBE FOR SAMPLING A FLUID FROM A DUCT AND METHOD OF OPERATION

CROSS REFERENCE TO RELATED APPLICATIONS

This application claims priority to International Patent Application No. PCT/EP2020/063879 filed May 19, 2020, which claims priority to European Patent Application No. 19176549.4 filed May 24, 2019; the disclosures of which are incorporated by reference herein in their entireties.

TECHNICAL FIELD

The present invention relates to a duct probe for sampling a fluid from a main fluid flow in a duct, to a duct sensor equipped with such a duct probe, and to a method of operating such a duct sensor.

PRIOR ART

From the prior art, duct probes are known for diverting a partial flow from a main fluid flow in a duct, passing the partial flow to a sensing element that is arranged outside the duct, and returning the partial flow to the duct after it has passed the sensing element. A duct probe typically has tubular shape, defining a longitudinal axis that extends perpendicular to the main fluid flow in the duct. The duct probe defines two channels: a supply channel for passing the partial flow from the duct to the sensing element outside the duct, and a discharge channel for returning the partial flow from the sensing element back to the duct. Each of the supply channel and the discharge channel is typically closed at the end that is located inside the duct, and open at the other end, which is located outside the duct. The open ends are in fluid communication with the sensing element. For diverting the partial flow from the duct into the supply channel, one or more inflow openings are provided in a wall of the supply channel. Often, but not necessarily, these inflow openings face the fluid flow in the duct. Similarly, for returning the partial flow to the main fluid flow, one or more outflow openings are provided in a wall of the discharge channel.

Examples of duct probes in various shapes and configurations are disclosed in US 2006/0027353 A1, US 2008/0257011 A1, US 2013/0160571 A1, US 2013/0255357 A1, EP 2 835 592 A1, and DE 10 2014 010 719 A1.

In operation, the duct probe is arranged in the duct such that the main fluid flow hits the duct probe laterally and passes around the duct probe. The resulting deflection of the main fluid flow will typically lead to a positive back pressure at the inflow openings and to a negative pressure at the outflow openings due to the Bernoulli/Venturi effect. Thereby a pressure difference results between the supply channel and the discharge channel, the magnitude of the pressure difference depending on the flow rate of the main fluid flow in the duct. This pressure difference will in turn drive the partial flow through the duct probe, the flow rate of the partial flow strongly depending on the flow rate of the main fluid flow.

In some applications, it is desired to minimize the pressure difference between the supply channel and the discharge channel or at least its dependence on the flow rate of the main fluid flow. This is true, in particular, if the sensing element implements a particle counter, since variations of the flow rate of the partial flow inevitably cause undesired variations of the number of particles that pass the particulate matter sensor per unit time. It may therefore be desirable to keep variations of the pressure difference between the inflow and outflow openings at a minimum.

US 2005/0097947 A1 discloses a duct probe forming a first passage extending from an air inlet to an air outlet. A second passage extends around a shunt plate, forming a bypass of the first passage. An air flow measuring element is arranged in the second passage for measuring a flow velocity or flow rate of air passing through the second passage. If an air flow that enters the duct probe contains dust or liquid matter, the dust or liquid matter passes through the first passage and is prevented from entering the second passage. Thereby the dust or liquid matter is prevented from contaminating the air flow measurement device in the second passage. In an embodiment, a step portion is formed at the meeting point of the first passage and the second passage, increasing the cross-section of the first passage there. As a result, dust or liquid matter contained in the air flow are temporarily trapped at the step portion. In another embodiment, the shunt plate has an inclined portion that projects into the first passage and is inclined towards the air outlet. In yet another embodiment, the shunt plate has an inclined portion that projects into the first passage and is inclined towards the air inlet. The inclined portion has a through-hole. EP 3 258 241 A2 discloses a particulate matter sensor device comprising a flow channel extending between a flow inlet and a flow outlet, a radiation source, and a radiation detector. A flow modifying device is provided for reducing particulate matter precipitation onto the radiation source, the radiation detector, or channel walls in their close proximity.

SUMMARY OF THE INVENTION

It is an object of the present invention to provide a duct probe that exhibits a reduced pressure difference between the supply channel and the discharge channel in the presence of a main fluid flow and/or a reduced dependence of the pressure difference on the flow rate of the main fluid flow.

Accordingly, a duct probe is provided for sampling a fluid from a main fluid flow in a duct. The duct probe defines an elongated supply channel and an elongated discharge channel, the supply channel and the discharge channel extending substantially along a longitudinal axis of the duct probe. In operation, the longitudinal axis of the duct probe will advantageously extend across the main fluid flow, preferably perpendicular to the main fluid flow. Each of the supply channel and the discharge channel has a closed end and an open end, the open end being configured for direct or indirect connection to an environmental sensor. The supply channel has at least one inflow opening, which is preferably formed in a lateral peripheral surface of the supply channel (the term "lateral" being used with respect to the longitudinal axis of the duct probe), for diverting a partial flow from the main fluid flow into the supply channel. Likewise, the discharge channel has at least one outflow opening, which is preferably formed in a lateral peripheral surface of the discharge channel, for returning the partial flow from the discharge channel into the main fluid flow after it has passed the environmental sensor. According to the present invention, the duct probe comprises at least one compensation channel that connects the supply channel and the discharge channel in a region that is located between the closed ends and the open ends of the supply channel and the discharge channel, respectively, in order to reduce a pressure difference between the supply channel and the discharge channel when the duct probe is exposed to a main fluid flow.

The inflow opening and the compensation channel are arranged and sized to cause a jet flow through the inflow opening, the jet flow being directed towards the compensation channel. The jet flow is generated when the duct probe is exposed to the main fluid flow, the inflow opening facing the main flow or being oriented relative to the main flow in some other manner such that a portion of the main fluid flow will enter the supply channel through the inflow opening. The portion of the main fluid flow that passes through the inflow opening is accelerated to form the jet flow. The jet flow is decelerated when it passes through the compensation channel. In other words, the maximum flow velocity of the jet flow is higher upstream of the compensation channel (i.e., on the side of the supply channel) than downstream of the compensation channel (i.e., on the side of the discharge channel). The deceleration causes a negative pressure difference between the upstream and downstream sides of the compensation channel, which counteracts the positive pressure difference caused by the backpressure at the inflow opening and by the negative pressure due to the Bernoulli/Venturi effect at the outflow opening. By choosing the dimensions of the inflow opening and compensation channel appropriately, the jet flow can be tailored such that the negative pressure difference compensates the positive pressure difference to such a degree that both the value of the resulting pressure difference between the supply channel and the discharge channel as well as its dependence on the flow rate of the main fluid flow are massively reduced.

In order to ensure that the jet flow is directed towards the compensation channel, the inflow opening and the compensation channel are preferably aligned along a common jet axis. The jet axis preferably extends across the longitudinal axis of the duct probe, in particular, perpendicular to the longitudinal axis. In use, the jet axis can advantageously be arranged along the direction of the main fluid flow. In some embodiments, also the outflow opening is arranged along the same jet axis. This may simplify manufacture of the duct probe.

In order to decelerate the jet flow when it passes through the compensation channel, it is preferred that the free cross-sectional area of the compensation channel is greater than the free cross-sectional area of the inflow opening. In addition, it is preferred that the outflow opening has a free cross-sectional area that is greater than or equal to the free cross-sectional area of the compensation channel so as to avoid excessive flow resistance at the outflow opening.

In particular, assuming that the inflow opening and the compensation channel have circular cross-sectional shape, a first geometric diameter D1 can be defined for the inflow opening, and a second geometric diameter D2 can be defined for the compensation opening. Further assuming that the downstream end of the inflow opening and the upstream end of the compensation opening are spaced by a distance W, an opening angle α can be defined by the following equation:

$$\tan\alpha = \frac{D2 - D1}{2W}.$$

The above definition of the opening angle can be readily generalized to situations where the inflow opening and the compensation channel do not have circular cross-sectional shape by replacing the geometric diameters D1, D2 of the inflow opening and of the compensation channel by their corresponding hydraulic diameters, the hydraulic diameter D of an opening or channel being defined as D=4A/P, where A is the cross-sectional area and P is the perimeter of the opening/channel. For a circular cross-section, the hydraulic diameter is identical to the geometric diameter. It is advantageous if the thus-defined opening angle is in the range of 2° to 4°. This finding is independent of the exact cross-sectional shapes of the inflow opening and the compensation channel, at least as long as the aspect ratio of each opening or channel is not too large. In the context of the present disclosure, the term "aspect ratio" is to be understood as relating to the ratio between the longest diametral dimension and the shortest diametral dimension of the clear cross section of an opening or channel, the term "diametral dimension" relating to a distance between two points on opposite sides of the perimeter of the clear cross section, a straight line through these points passing through the geometric center (centroid) of the clear cross section. For instance, under this definition of the term "aspect ratio", the aspect ratio of a circle is 1:1; for a square, it is $\sqrt{2}$:1, etc. In particular, the above-mentioned preferred range of the opening angle of 2° to 4° is expected to be valid at least as long as the aspect ratio is below approximately 2.5:1, such as for a rectangle with a ratio between its long and short edges below about 2:1, a trapezoid with a ratio of average length to height between about 1:2 and about 2:1, an ellipse with a ratio between major and minor axis below 2.5:1, etc. Ideally, the cross-sectional areas of the inflow opening and of the compensation channel are chosen and oriented such that the cross-sectional area of the compensation channel fully covers the cross-sectional area of the inflow opening in a projection along the jet axis.

For larger aspect ratios, different opening angles might be optimal.

In some embodiments, the compensation channel is formed by a compensation opening in a separating wall that is common to both the supply channel and the discharge channel. In particular, the duct probe can have tubular shape, preferably cylindrical shape, and comprise a straight, flat separating wall that separates the discharge channel from the supply channel inside the duct probe. In other embodiments, the compensation channel can be formed in a different manner, e.g., by a short pipe between the supply channel and the discharge channel if these channels are formed by separate tubes.

The duct probe can be complemented by an environmental sensor to form a complete duct sensor. The environmental sensor can comprise a measurement channel and a sensing element inside or adjacent to the measurement channel, the measurement channel being directly or indirectly connected to the open ends of the supply channel and the discharge channel of the duct probe. In this manner, a partial flow that enters the supply channel through the inflow opening flows through the supply channel into the measurement channel, passes the sensing element, and flows from the measurement channel through the discharge channel into the outflow opening. The connection between the duct probe and the environmental sensor can be direct, e.g., by directly mounting a sensor housing of the environmental sensor on the duct probe, or it can be indirect, e.g., via rigid or flexible tubing.

In particular, the environmental sensor can be a particulate matter sensor. In order to create the partial flow at a defined flow rate, the environmental sensor can comprise a fan.

A method of operating such a duct sensor can comprise:
arranging the duct probe in a duct, the longitudinal axis of the duct probe extending across a main flow direction of the duct;
generating a main fluid flow through the duct along the main flow direction, thereby causing a jet flow through the inflow opening towards the compensation channel; and
diverting a partial flow from the inflow opening into the supply channel, passing the partial flow through the measurement channel past the sensing element, and passing the partial flow through the discharge channel to the outflow opening.

In particular, the duct sensor is operated under such conditions that the jet flow is decelerated when it passes through the compensation channel, i.e., the jet flow has a higher maximum velocity upstream from the compensation channel than downstream from it, in order to efficiently reduce the pressure difference between the supply channel and the discharge channel. The jet flow is generated by accelerating the fluid that passes through the inflow opening. Specifically, the jet flow advantageously has a maximum velocity in the supply channel downstream from the inflow opening and upstream from the compensation channel that exceeds an average velocity of the main fluid flow at the same location that would be present in the absence of the duct probe.

Advantageously, the fluid of the main fluid flow is a compressible fluid. Preferably the fluid is a gas, in particular, air, or an aerosol, i.e., a suspension of fine solid particles or liquid droplets in a gas such as air.

As already discussed, the environmental sensor can be a particulate matter sensor, and the method can comprise determining a particle concentration and/or size distribution in the partial flow, using the particulate matter sensor. However, the environmental sensor can also be any other type of sensor for determining at least one property of the partial flow, such as a gas sensor for determining a composition and/or concentration of one or more analyte gases in the partial flow, a humidity sensor, a temperature sensor etc.

The environmental sensor can comprise a fan, and the method can comprise sustaining the partial flow using the fan.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
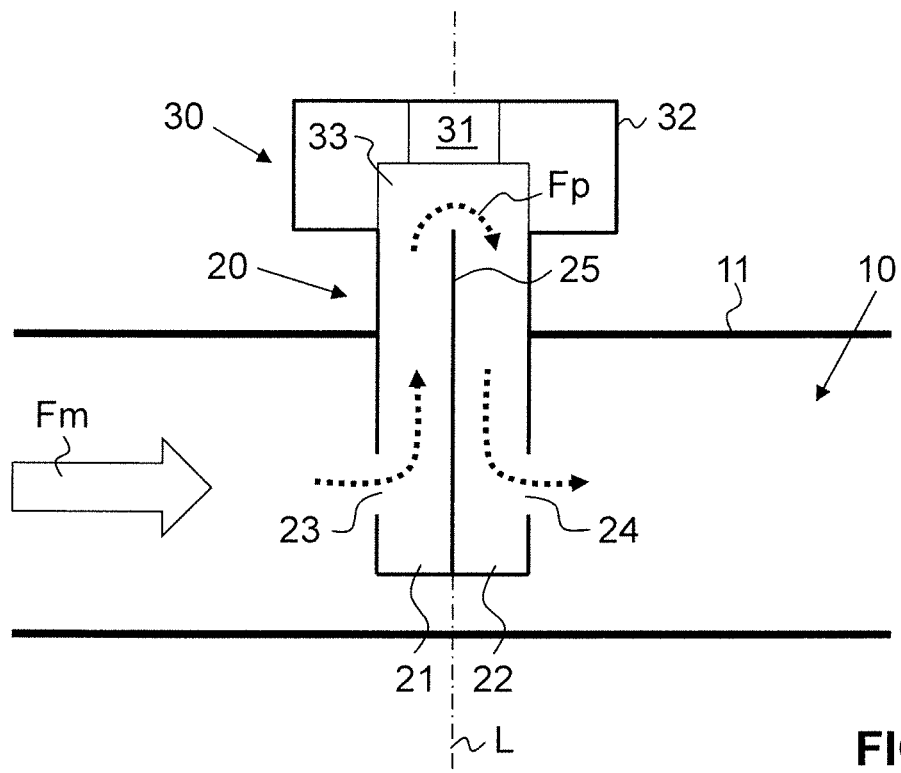
FIG. 1 shows, in a highly schematic manner, a longitudinal sectional view of a duct sensor comprising a duct probe according to the prior art.

FIG. 1 illustrates, in a highly schematic manner and not to scale, a duct sensor that includes a duct probe 20 according to the prior art.

An environmental sensor 30 comprises a sensor element 31 that is housed in a sensor housing 32. The sensor housing 32 defines a measurement channel 33, the sensor element 31 being arranged in or adjacent to the measurement channel 33.

The environmental sensor 30 is arranged outside a duct 10 that carries a main fluid flow Fm. The duct 10 is delimited by a duct wall 11. An elongated duct probe 20 extends from the sensor housing 32 through a probe opening of the duct wall 11 into the inside of the duct 10. The duct probe 20 defines a longitudinal axis L that extends perpendicular to the main fluid flow Fm. Inside the duct probe 20, two parallel channels extend along the longitudinal axis L: a supply channel 21 and a discharge channel 22. The channels are separated by a separating wall 25. Each channel is closed at its respective end that is located inside the duct 10, while it is open at its respective end that is connected to the environmental sensor 30 outside the duct 10. A lateral inflow opening 23 is present in the circumferential side wall of the supply channel 21, facing the main fluid flow Fm. A lateral outflow opening 24 is present in the circumferential side wall of the discharge channel 22. The outflow opening 24 is arranged downstream from the inflow opening 23 with respect to the main fluid flow Fm, facing away from the main fluid flow Fm.

At its open end, the supply channel 21 opens out into the measurement channel 33. The measurement channel 33 in turn opens out into the discharge channel 22. The measurement channel 33 forms the only connection between the supply channel 21 and the discharge channel 22. In particular, the supply channel 21 and the discharge channel 22 are not connected anywhere along the length of the duct probe 20 between their closed and open ends, i.e., the separating wall 25 does not have any openings.

In operation, the main fluid flow Fm in the duct 10 hits the duct probe laterally. The main fluid flow Fm creates a positive backpressure at the inflow opening 23 and a negative pressure at the outflow opening 24 due to the Venturi/

Bernoulli effect. The resulting pressure difference between the inflow opening 23 and the outflow opening 24 depends on the flow rate of the main fluid flow Fm.

As a result of the pressure difference, a partial flow Fp is created through the duct sensor. The partial flow enters the supply channel 21 through the inflow opening 23. The partial flow Fp flows upwards through the supply channel 21 into the measurement channel 33, past the sensor element 31, and downwards through the discharge channel 22, before leaving the duct probe 20 at the outflow opening 24. The sensor element 31 detects one or more properties of the partial flow Fp. The flow rate of the partial flow Fp strongly depends on the pressure difference between the supply channel 21 and the discharge channel 22, which in turn strongly depends on the flow rate of the main fluid flow Fm.

Figure 2:
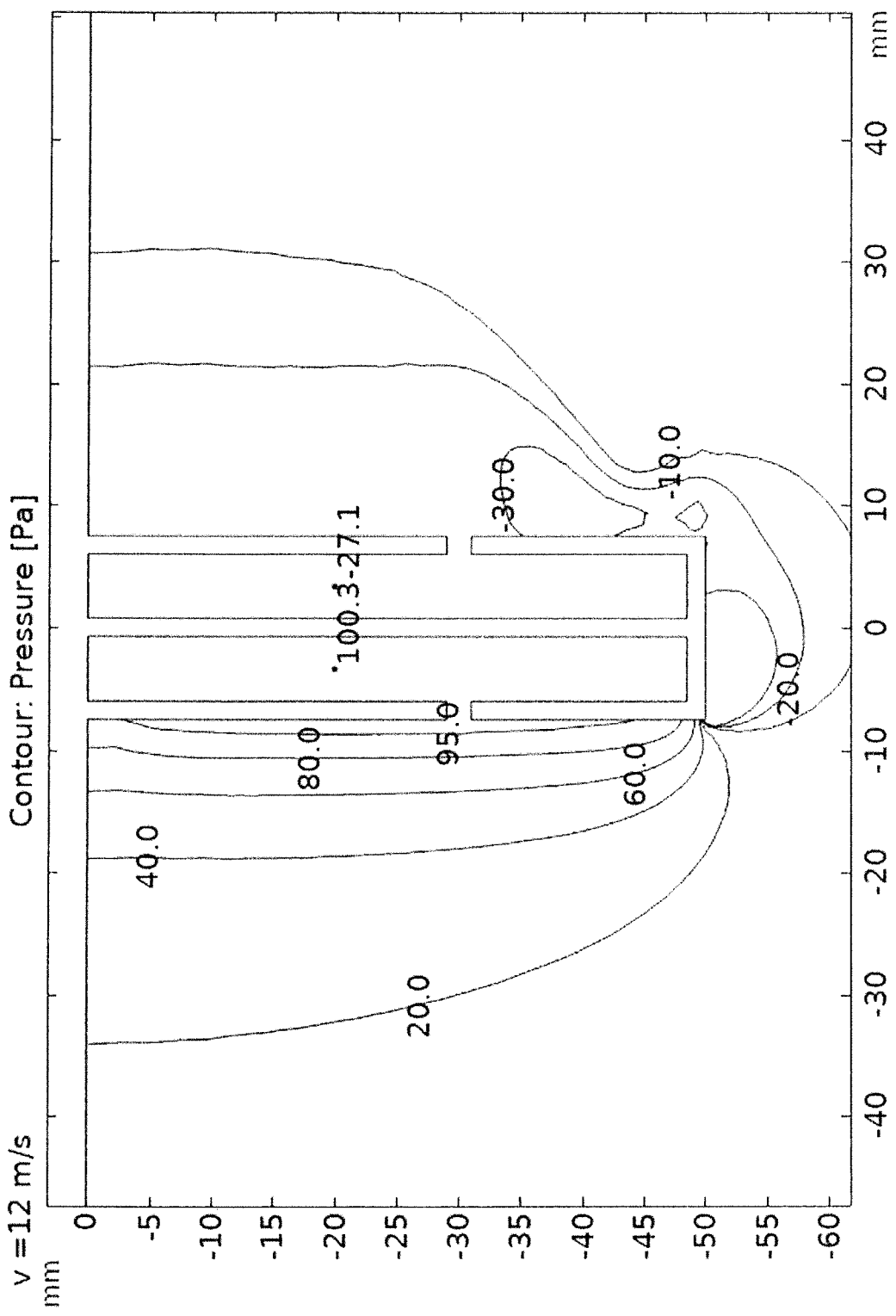
FIG. 2 shows a two-dimensional diagram that illustrates a simulated pressure distribution inside and outside the duct probe in FIG. 1.

FIG. 2 illustrates a simulated pressure distribution inside and outside the duct probe 10. The data shown in this figure were created through a numerical simulation of fluid dynamics, using the software COMSOL Multiphysics, Version 5.4. The following assumptions were made in the simulation: The duct 10 has a square cross section with a clear width of 120 mm and a height of 100 mm. The duct probe 20 has a circular cross section with an outer diameter of 15 mm and a wall thickness of 1.5 mm. Inside the duct probe 20, a straight, flat separating wall 25 of thickness 1.5 mm separates the supply channel 21 from the discharge channel 22. The length of the portion of the duct probe 20 that extends inside the duct is 50 mm. The inflow opening 23 has circular shape with a diameter of 2.0 mm. Its centre is located at a distance of 30 mm from the duct wall. Likewise, the outflow opening 24 has circular shape with a diameter of 2.0 mm; its centre is also located at a distance of 30 mm from the duct wall. The fluid used for the simulations was air at standard conditions (1013 hPa, 20° C.). A main fluid flow Fm having a homogeneous flow velocity distribution with a flow velocity of 12 m/s at the entrance of the duct was assumed. A k-epsilon turbulence model was used. The flow resistance of the environmental sensor was assumed to be essentially infinite, resulting in a negligible flow rate of the partial flow Fp.

The simulation results in FIG. 2 demonstrate the presence of a considerable pressure difference dp between the supply channel 21 and the discharge channel 22.

Figure 3:
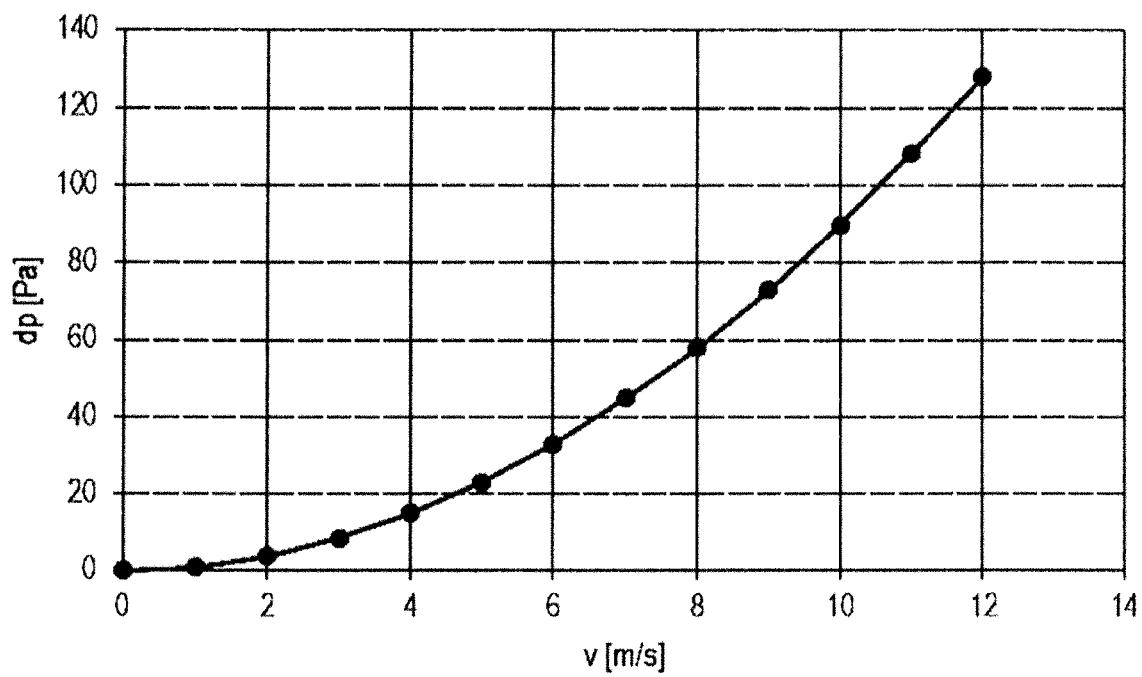
FIG. 3 shows a diagram illustrating the pressure difference between the supply channel and the discharge channel of the duct probe in FIG. 1 as a function of the flow velocity of the main fluid flow in the duct.

The simulation was repeated for different flow rates of the main fluid flow Fm, with flow velocities at the duct entrance in the range between 0 and 12 m/s. FIG. 3 illustrates that the pressure difference dp strongly depends on the flow velocity v of the main fluid flow Fm in the duct 10, rising continuously and monotonically with increasing flow velocity and following approximately a quadratic function. At a flow velocity of 6 m/s, the pressure difference is approximately 32 Pa. At a flow velocity of 12 m/s, the pressure difference is almost 130 Pa.

Such a strong dependence of the pressure difference on the flow rate of the main fluid flow Fm may be undesirable. This is true, in particular, in applications where the environmental sensor 30 is a particulate matter sensor for determining a concentration and/or size distribution of particulate matter in the main fluid flow. A well-known type of particulate matter sensor acts as a particle counter, comprising a radiation source and a radiation detector. The radiation source, typically a laser, creates radiation in a measurement zone. The radiation is scattered by particles that enter the measurement zone. The radiation detector, typically a photodetector, registers single scattering events from individual particles. From the frequency of the scattering events and the flow rate through the measurement zone, the number concentration of the particles can be inferred. From the intensity of each scattering event, the size of each particle can be inferred. By combining both quantities, a measure for the mass concentration of the particles can be obtained. Since the flow rate enters the determination of the number density, it is desirable to closely control the flow rate through the environmental sensor 30. However, the presence of a considerable and strongly varying pressure difference between the supply channel 21 and the discharge channel 22 makes it difficult to control this flow rate.

Figure 4:
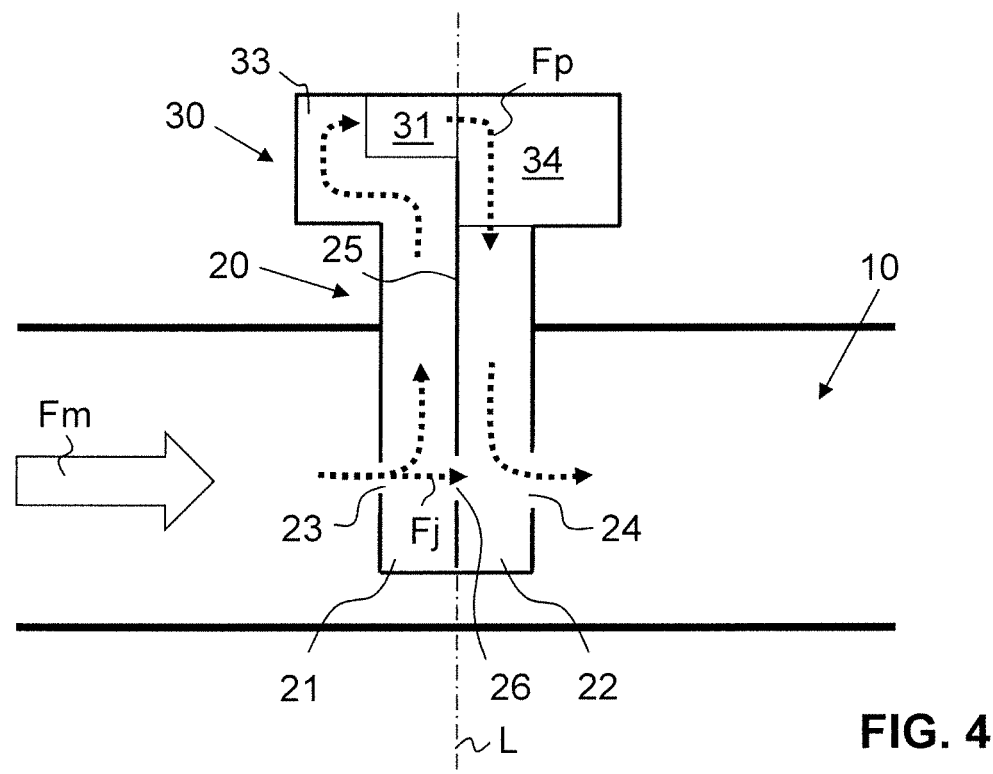
FIG. 4 shows, in a highly schematic manner, a longitudinal sectional view of a duct sensor comprising a duct probe according to the present invention.

FIG. 4 illustrates, in a highly schematic manner and not to scale, a duct sensor according to an embodiment of the present invention. The general setup of the duct sensor is similar to the prior-art duct sensor in FIG. 1. Again, the duct sensor comprises an environmental sensor 30 that includes a sensor element 31 and a sensor housing 32 that defines a measurement channel 33 for a partial flow Fp. In the present example, the environmental sensor 30 further includes a fan 34 for actively sustaining the partial flow Fp through the measurement channel 33. However, in other embodiments, the fan can be omitted. Furthermore, in the present example, the sensor element 31 is arranged in the measurement channel 33 in such a manner that the partial flow Fp passes through the sensor element 31. However, in other embodiments, the sensor element 31 may be arranged adjacent the measurement channel 33 such that the partial flow flows over the sensor element 31, as in the embodiment in FIG. 1.

As in the prior-art embodiment in FIG. 1, a supply channel 21 and a discharge channel 22 extend inside the duct probe 20 along its longitudinal axis L, the channels being parallel to each other and being separated by a straight, flat, elongated separating wall 25. As in the prior-art embodiment in FIG. 1, each channel is closed at its respective end that is located inside the duct 10, while it is open at its respective end that is connected to the sensor housing 30 outside the duct 10. As in the prior-art embodiment in FIG. 1, a lateral inflow opening 23 is present in the circumferential side wall of the supply channel 21, facing the main fluid flow Fm, and a lateral outflow opening 24 is present in the circumferential side wall of the discharge channel 22 downstream from the inflow opening 23.

In contrast to the prior-art embodiment in FIG. 1, a compensation channel 26 is present between the supply channel 21 and the discharge channel 22 in a region between their respective closed and open ends. The compensation channel 26 is formed by a . compensation opening in the separating wall 25 that separates the supply channel 21 and the discharge channel 22. The inflow opening 23 and the compensation channel 26 are aligned along a common jet axis. The jet axis extends perpendicular to the longitudinal axis L of the duct probe, along the flow direction of the main fluid flow Fm. In the present example, also the outflow opening 24 is aligned with the jet axis.

Because of the presence of the compensation channel 26, a jet flow Fj is created through the inflow opening 23, the jet flow being directed towards the compensation channel 26. The jet flow is decelerated when it passes through the compensation channel 26, thereby causing a negative pressure difference between the supply channel 21 and the discharge channel 22. This negative pressure difference counteracts the positive pressure difference that is caused by the main fluid flow Fm when it hits the duct probe 20 and is deflected around it. Thereby the jet flow Fj acts to reduce the pressure difference between the supply channel 21 and the discharge channel 22 that would be present in the absence of the compensation channel 26. At the same time, the jet flow Fj reduces the dependence of this pressure difference on the flow rate of the main fluid flow Fm.

Simulations were carried out to determine the expected velocity distribution inside and around a duct probe as illustrated in FIG. 4. The same assumptions were made in the simulation as described above in conjunction with FIG. 2. The simulations showed that the jet flow Fj is significantly accelerated when it passes through the inflow opening 23 and decelerated again when it passes through the compensation channel 26. The maximum flow velocity of the jet flow Fj was much larger in the supply channel 21 upstream from the compensation channel 26 than in the discharge channel 22 downstream from the compensation channel 26. The maximum flow velocity of the jet flow Fj was also significantly larger than the average flow velocity of the main fluid flow Fm that would be present at the same location in the absence of the duct probe and at the same total flow rate through the duct.

Figure 5:
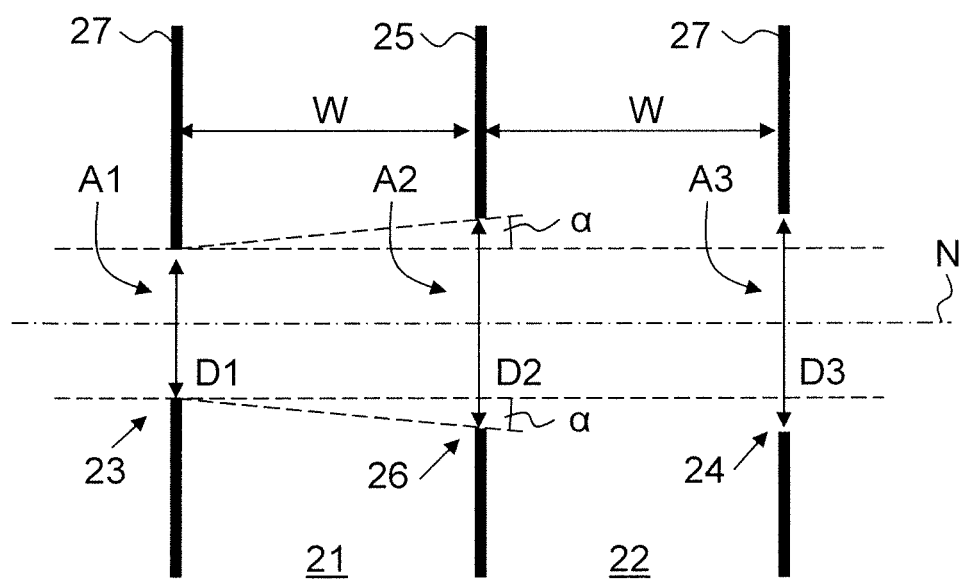
FIG. 5 shows a diagram illustrating the relative sizes of the inflow opening, the compensation opening, and the outflow opening.

In order to ensure that the flow velocity of the jet flow Fj is larger at the upstream side of the compensation channel 26 than at its downstream side, the cross-sectional area of the compensation channel 26 is advantageously larger than the cross-sectional area of the inflow opening 23. In addition, in order to avoid that the outflow opening forms a bottleneck with excessive flow resistance, the cross-sectional area of the outflow opening 24 is advantageously larger than or equal to the cross-sectional area of the compensation channel 26. This is illustrated by the way of example in FIG. 5. In this example, the inflow opening 23, the compensation channel 26, and the outflow opening 24 are assumed to have circular shape. The inflow opening 23 and the outflow opening 24 are each formed in a circumferential wall 27 of the duct probe; the compensation channel 26 is formed in the separating wall 25. The diameter of the inflow opening 23 is designated as D1, the diameter of the compensation channel 26 is designated as D2, and the diameter of the outflow opening 24 is designated as D3. The corresponding cross-sectional areas are designated as A1, A2, and A3, respectively. The width of the supply channel 21, measured along the jet axis N between the inflow opening 23 and the compensation channel 26, is designated as W. In the present example, the discharge channel 22 has the same width W between the compensation channel 26 and the outflow opening 24. In order to decelerate the jet flow when it passes through the compensation channel 26, the cross-sectional area of the compensation channel 26 is somewhat larger than the cross-sectional area of the inflow opening 23, i.e., D2>D1. In the present example, the cross-sectional area of the outflow opening 24 is the same as the cross-sectional area of the compensation channel 26, i.e., D3=D2.

Generally speaking, the parameters D1, D2, D3, and W, among others, can be tuned to optimize the dependence of the pressure difference between the supply channel 21 and the discharge channel 22 on the flow rate of the main fluid flow Fm. In order to more easily quantify the difference between the sizes of the inflow opening 23 and the compensation channel 26 independent of absolute dimensions, a dimensionless opening angle α can be introduced, which is defined by the following relationship:

$$\tan\alpha = \frac{D2 - D1}{2W}$$

Instead of using the geometric diameters D1, and D2, the corresponding hydraulic diameters may be used.

In order to evaluate the effects of the jet flow Fj on the pressure difference between the supply channel 21 and the discharge channel 22, simulations of the pressure distribution inside and around the duct probe in FIG. 4 were carried out, again with the same assumptions as described above in conjunction with the simulations shown in FIG. 2. The opening angle α was varied, and the dependence of the pressure difference between the supply channel 21 and the discharge channel 22 on the flow velocity of the main fluid flow Fm upstream from the duct probe was evaluated for each opening angle. It was found that the optimum value for the opening angle α was (2.7±0.3)°, leading to the smallest variation of the pressure difference for flow velocities between 0 and 12 m/s. While this result was achieved for the specific probe dimensions discussed above in conjunction with FIG. 2, the result is expected to depend only weakly on the absolute dimensions of the probe, on the exact shape of the probe, or on the shape of the openings as long as these variations are within reasonable bounds. Of course, for a completely different geometry of the duct probe or for completely different shapes of the openings (e.g., narrow slits having a large aspect ratio), different opening angles might be optimal.

Figure 6:
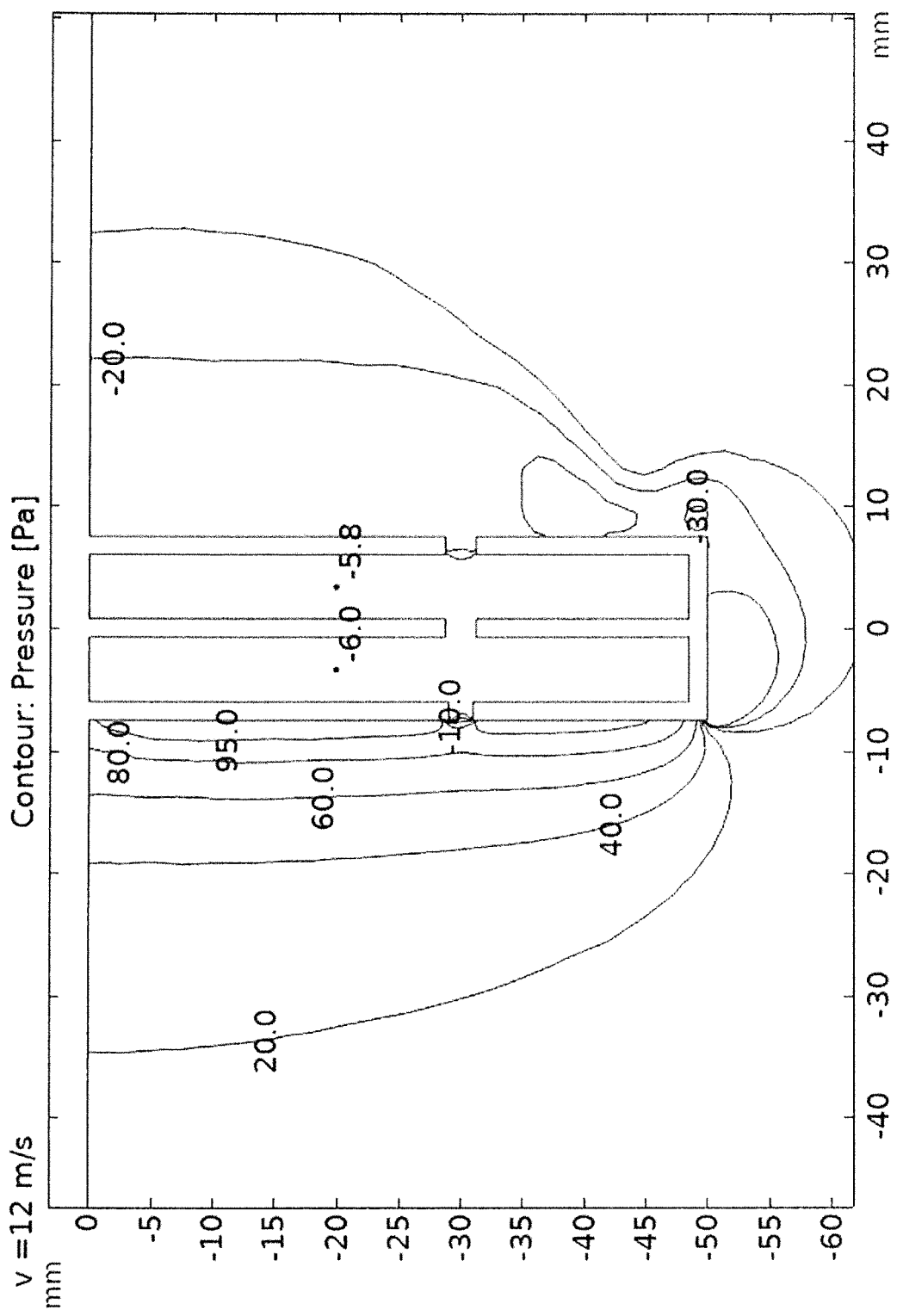
FIG. 6 shows a two-dimensional diagram that illustrates a simulated pressure distribution inside and outside the duct probe in FIG. 4.

FIG. 6 shows a two-dimensional diagram that illustrates the resulting pressure distribution at the optimum opening angle of 2.7° for a flow velocity of 12 m/s. As expected, the pressure distribution is almost unchanged as compared to the diagram in FIG. 2 outside the duct probe. However, as a result of the jet flow Fj, pressure is dramatically reduced (from almost +100 Pa to approximately −10 Pa) inside the inflow opening. The pressure inside the supply channel 21 is reduced from approximately +100 Pa to approximately −6 Pa. On the other hand, the pressure in the discharge channel 22 has risen from approximately −27 Pa to approximately −6 Pa, again, which again is due to the jet flow Fj. The resulting total pressure difference between the supply channel 21 and the discharge channel 22 is almost zero.

Figure 7:
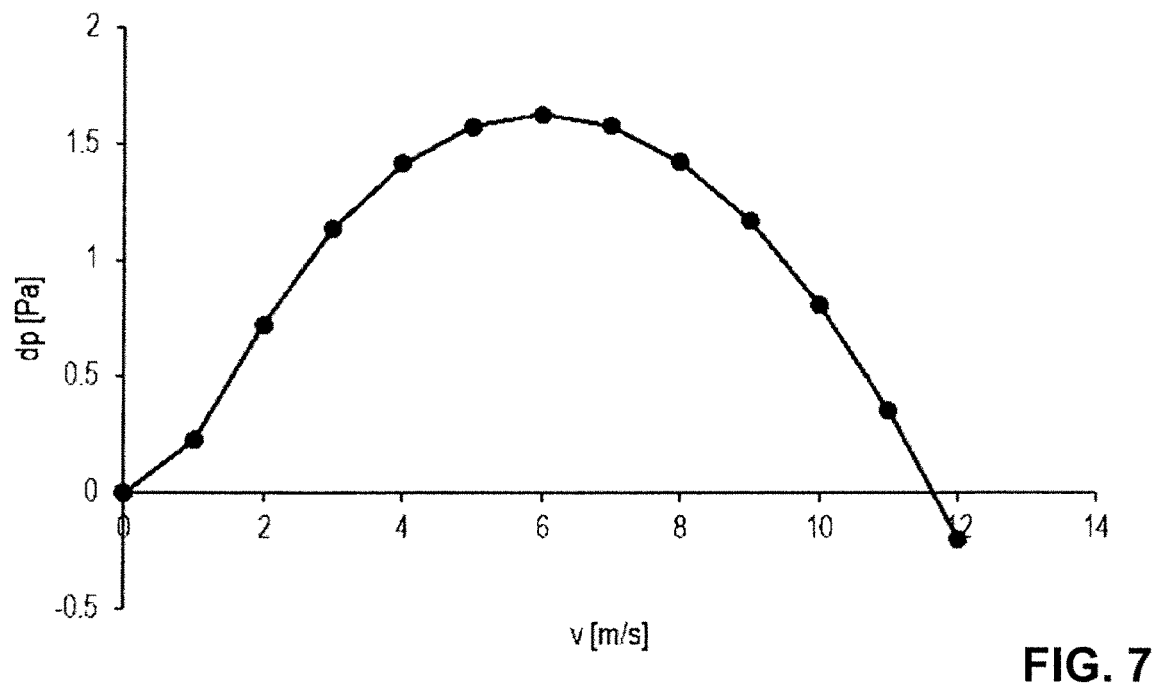
FIG. 7 shows a diagram illustrating the pressure difference between the supply channel and the discharge channel of the duct probe in FIG. 4 as a function of the flow velocity of the main fluid flow in the duct.

FIG. 7 shows the dependence of the simulated pressure difference dp between the supply channel 21 and the discharge channel 22 on the flow velocity of the main fluid flow Fm upstream from the duct probe for the optimized opening angle of 2.7°. For flow velocities between 0 and 12 m/s, the pressure difference never exceeds 1.7 Pa, having a maximum at a flow velocity of approximately 6 m/s and being close to zero at a flow velocity of 12 m/s. This is in contrast to the simulated pressure difference for a conventional duct probe in FIG. 3, which sharply rises with increasing flow velocity and exceeds 120 Pa at a flow velocity of 12 m/s. These simulation results show that the present invention can achieve a massive reduction of the pressure difference and of its dependence on the flow rate of the main fluid flow Fm.

While the simulations were carried out for a single inflow opening 23, a single outflow opening 24, and a compensation channel 26 in the form of a single compensation opening, each of these openings having circular shape, different numbers and geometries of these openings are conceivable. This illustrated by way of example in FIGS. 8 and 9.

Figures 8, 9:
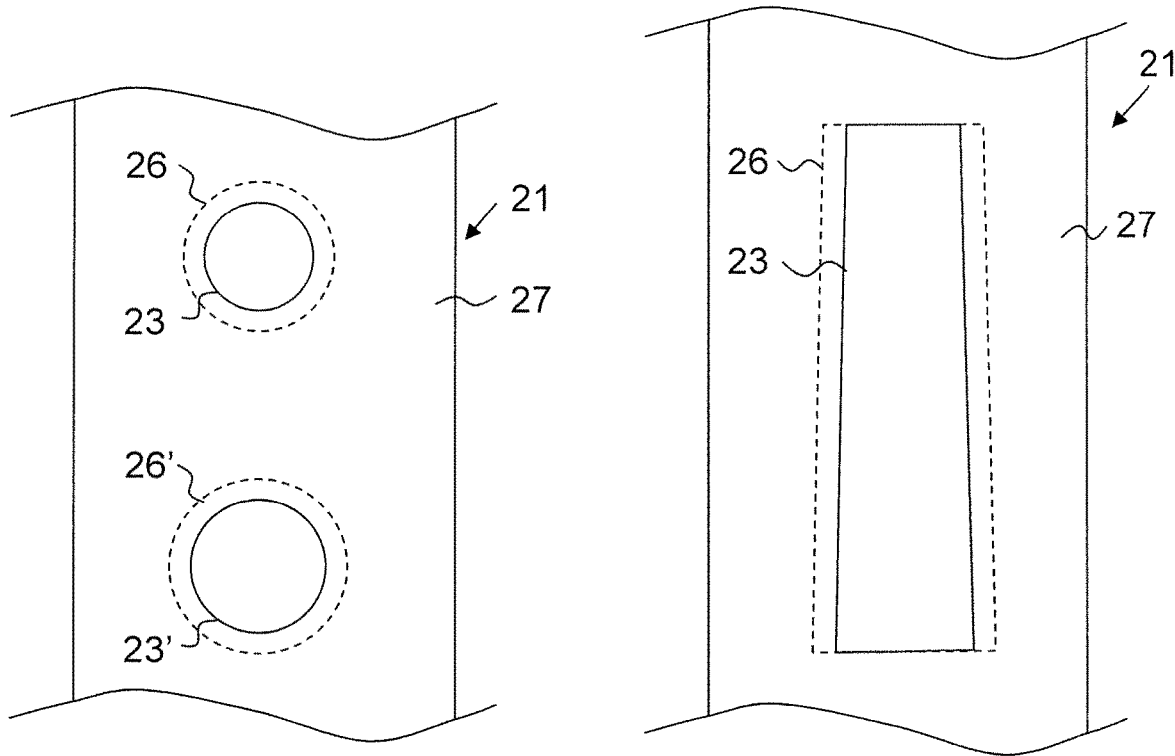
FIG. 8 shows, in a highly schematic manner, a front view of a portion of a duct probe that has two inflow openings of different sizes and two associated compensation openings.
FIG. 9 shows, in a highly schematic manner, a front view of a portion of a duct probe that has a slit-like inflow opening and an associated slit-like compensation opening.

FIG. 8 illustrates that more than one set of inflow openings and compensation channels can be provided. These sets may have different dimensions. Thereby, the dependence of the pressure difference on the flow velocity of the main fluid flow Fm can be further optimized. In the example of FIG. 8, a first jet flow is created through a first inflow opening 23 and a first compensation channel 26. A second jet flow is created through a second inflow opening 23' and a second compensation channel 26'. Due to the different dimensions of the inflow openings and compensation channels, the negative pressure difference that is caused by each jet flow will be different for the two jet flows. By tailoring the dimensions of the inflow openings and compensation channels, the dependence of the pressure difference between the supply and discharge channels on the flow velocity of the main fluid flow Fm can be optimized. The outflow openings are not illustrated in FIG. 8. Instead of providing separate outflow openings for each set of first and second inflow openings and compensation channels, it is conceivable to provide a single common outflow opening.

FIG. 9 illustrates that the inflow opening, the outflow opening and the compensation channel can each have a cross-sectional shape that is different from circular. In the present example, the cross-sectional shape of the inflow opening and of the compensation channel is slit-like and trapezoidal, the cross-sectional area of the compensation channel fully covering the inflow opening in a projection along the common jet axis. By optimizing shape and size of the inflow opening and the compensation channel, again the dependence of the pressure difference between the supply and discharge channels on the flow velocity of the main fluid flow Fm can be optimized.

Of course, many other shapes of the inflow opening(s) and compensation channel(s) are conceivable.

Figure 10:
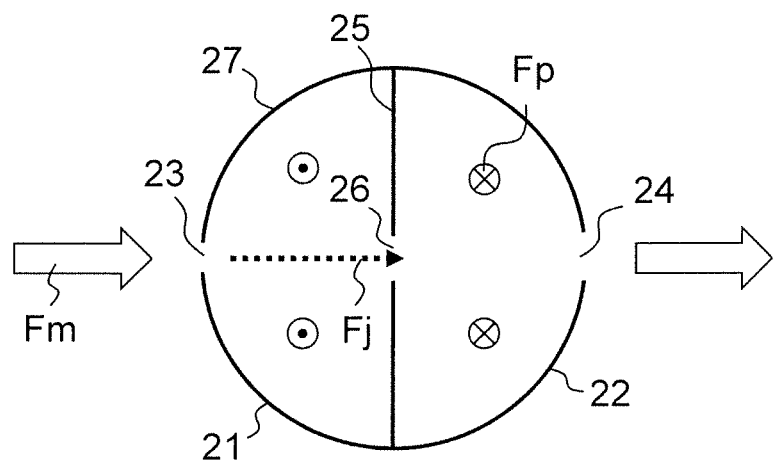
FIG. 10 shows, in a highly schematic manner, a cross-sectional view of a duct probe having circular-cylindrical shape and having a separating wall that separates the interior of the duct probe into a supply channel and a discharge channel.
Figure 11:
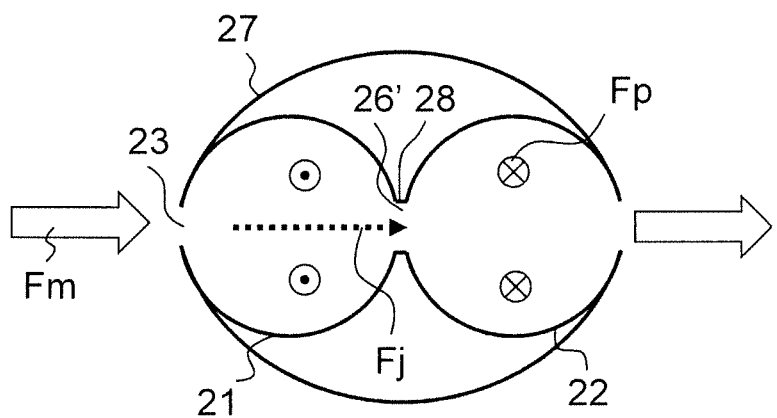
FIG. 11 shows, in a highly schematic manner, a cross-sectional view of a duct probe having an oval outer boundary and two separate tubes inside, which form a supply channel and a discharge channel.

While the simulations in the above-described examples were carried out for a circular-cylindrical duct probe having a straight, flat separating wall, different probe designs may be used. This is illustrated in FIGS. 10 and 11. In the embodiment of FIG. 10, the duct probe has circular cross section and a straight, flat separating wall 25, in which a compensation channel 26 in the form of a simple compensation opening is formed. The partial flow Fp through the supply channel 21 and the discharge channel 22 is indicated by dots and crosses within a small circle, a dot indicating a flow direction out of the drawing plane, and a cross indicating a flow direction into the drawing plane. The jet flow Fj is indicated by an arrow drawn in a broken line. In the embodiment of FIG. 11, the duct probe has an oval cross section. Two parallel tubes are arranged within the duct probe. forming the supply channel 21 and the discharge channel 22. A compensation channel 26 is formed by a short pipe 28 between the tubes. Many other probe designs are conceivable, including designs with more than one supply channel and/or more than one discharge channel.

While in the embodiment of FIG. 4 the environmental sensor 30 is directly connected to the open ends of the supply channel 21 and discharge channels 22, it is also conceivable to connect the environmental sensor 30 to the duct probe 20 via rigid or flexible tubing.

The present invention is of particular advantage if the environmental sensor 30 is a particulate matter sensor for determining a concentration and/or size distribution of particulate matter in the main fluid flow. However, the environmental sensor 30 does not need to be a particulate matter sensor. In other embodiments, the environmental sensor may be a gas sensor for determining a composition and/or concentration of one or more analyte gases in the main fluid flow, a humidity sensor, a temperature sensor etc.

The present invention makes it possible to closely control the flow rate through the environmental sensor 30, e.g., by using an integrated fan, without the need to compensate for a pressure difference inside the duct probe that is created by the main fluid flow.

The invention claimed is:

1. A duct probe for sampling a fluid from a main fluid flow in a duct,
the duct probe defining comprising an elongated supply channel and an elongated discharge channel, the supply channel and the discharge channel extending substantially along a longitudinal axis of the duct probe,
each of the supply channel and the discharge channel having a closed end and an open end, the open end configured for direct or indirect connection to an environmental sensor,
the supply channel having at least one inflow opening for diverting a partial flow from the main fluid flow into the supply channel, and the discharge channel having at least one outflow opening for returning the partial flow from the discharge channel into the main fluid flow after it has passed the environmental sensor,
the duct probe further comprising at least one compensation channel that connects the supply channel and the discharge channel in a region that is located between the closed ends and the open ends of the supply channel and the discharge channel, respectively, in order to reduce a pressure difference between the supply channel and the discharge channel when the duct probe is exposed to a main fluid flow,
wherein the inflow opening and the compensation channel are arranged and sized to cause a jet flow through the inflow opening, the jet flow being directed towards the compensation channel and being decelerated when it passes through the compensation channel.

2. The duct probe of claim 1, wherein the inflow opening and the compensation channel are arranged and sized to cause the jet flow by acceleration of a portion of the main fluid flow that passes through the inflow opening.

3. The duct probe of claim 1, wherein the inflow opening and the compensation channel are aligned along a common jet axis.

4. The duct probe of claim 1, wherein the inflow opening has a first cross-sectional area and the compensation channel has a second cross-sectional area, the second cross-sectional area being greater than the first cross-sectional area.

5. The duct probe of claim 4,
wherein the inflow opening has a first hydraulic diameter D1, wherein the compensation channel has a second hydraulic diameter D2, and wherein a downstream end of the inflow opening and an upstream end of the compensation channel are spaced by a distance W,
wherein an opening angle a is defined by the following equation:

$$\tan\alpha = (D2 - D1)/2W,$$

and wherein the opening angle $\alpha$ is in the range of 2° to 4°.

6. The duct probe of claim 1, wherein the duct probe comprises a separating wall that separates the discharge channel from the supply channel, and wherein the compensation channel is formed by a compensation opening in the separating wall.

7. A duct sensor comprising:
the duct probe of claim 1; and
an environmental sensor,
wherein the environmental sensor comprises a measurement channel and a sensing element that is arranged inside or adjacent to the measurement channel, the measurement channel being directly or indirectly connected to the open ends of the supply channel and the discharge channel.

8. The duct sensor of claim 7, wherein the environmental sensor is a particulate matter sensor.

9. The duct sensor of claim 7, wherein the environmental sensor comprises a fan.

10. A method of operating the duct sensor according to claim 7, the method comprising:
arranging the duct probe of the duct sensor in a duct, the longitudinal axis of the duct probe extending across a main flow direction of the duct;
generating a main fluid flow through the duct along the main flow direction, thereby causing a jet flow through the inflow opening, the jet flow being directed towards the compensation channel and being decelerated when it passes through the compensation channel; and
diverting a partial flow from the inflow opening into the supply channel, passing the partial flow through the measurement channel past the sensing element, and passing the partial flow through the discharge channel to the outflow opening.

11. The method of claim 10, wherein the jet flow is caused by acceleration of a portion of the main fluid flow that passes through the inflow opening.

12. The method of claim 10, wherein the jet flow has a maximum velocity that exceeds an average velocity of the main fluid flow in the absence of the duct probe.

13. The method of claim 10, wherein the environmental sensor is a particulate matter sensor, and wherein the method comprises determining a particle concentration and/or size distribution in the partial flow, using the particulate matter sensor.

14. The method of claim 10, wherein the environmental sensor comprises a fan, and wherein the partial flow is sustained by the fan.

\* \* \* \* \*